United States Patent [19]

McConnell

[11] Patent Number: 5,630,063
[45] Date of Patent: May 13, 1997

[54] DATA DISTRIBUTION SYSTEM FOR MULTI-PROCESSOR MEMORIES USING SIMULTANEOUS DATA TRANSFER WITHOUT PROCESSOR INTERVENTION

[75] Inventor: William D. McConnell, Garland, Tex.

[73] Assignee: Rockwell International Corporation, Seal Beach, Calif.

[21] Appl. No.: 603,200

[22] Filed: Feb. 19, 1996

Related U.S. Application Data

[63] Continuation of Ser. No. 234,658, Apr. 28, 1994, abandoned.

[51] Int. Cl.[6] .................................................. G06F 13/00
[52] U.S. Cl. ............................. 395/200.03; 395/200.02
[58] Field of Search ......................... 395/200.03, 200.02

[56] References Cited

U.S. PATENT DOCUMENTS

| | | | |
|---|---|---|---|
| 4,214,305 | 7/1980 | Tokita et al. | 395/325 |
| 4,414,624 | 11/1983 | Summer, Jr. et al. | 395/650 |
| 4,418,382 | 11/1983 | Larson et al. | 395/200 |
| 4,566,080 | 1/1986 | Fang et al. | 365/185 |
| 4,587,637 | 5/1986 | Ishizuka | 365/189 |
| 4,663,742 | 5/1987 | Anderson et al. | 365/189 |
| 4,691,280 | 9/1987 | Bennett | 395/325 |
| 4,744,061 | 5/1988 | Takemae et al. | 365/201 |
| 4,905,145 | 2/1990 | Sauber | 395/425 |
| 4,912,680 | 3/1990 | Masaki et al. | 365/230.09 |

*Primary Examiner*—Krisna Lim
*Attorney, Agent, or Firm*—M. Lee Murrah; George A. Montanye

[57] ABSTRACT

A data distribution device transfers digitized audio and digital data between memories of processors in a multi-processor communications system on a sample bus without protocols or handshaking between the source and destination processors. The device is capable of dynamic reconfiguration of its distribution pattern when peripherally commanded and has individual control over all memory read, chip select and write lines. Through an indirect register addressing scheme the present system has the ability to read from an address within any single memory and then write to an address within any or all other memories of the processors within the communications system.

3 Claims, 2 Drawing Sheets

DATA DISTRIBUTION SYSTEM FOR MULTI-PROCESSOR MEMORIES USING SIMULTANEOUS DATA TRANSFER WITHOUT PROCESSOR INTERVENTION

This application is a continuation of application Ser. No. 08/234,658, filed Apr. 28, 1994, now abandoned.

TECHNICAL FIELD OF THE INVENTION

The present invention relates to communications systems, and more particularly to a multi-processor data distribution system for efficiently transferring data among processor memory devices.

BACKGROUND OF THE INVENTION

Typical communications systems are comprised of multiple equipment elements. To accomplish connectivity, these elements include user interface devices, media equipment, signal processing, message processing, and switching. A traditional communication system utilizes distributed memory architecture having multiple processors and associated memory devices. A data bus interconnects the memory devices, such that the data bus lines are tied in parallel to all the memory devices. The read/write line contains a signal that communicates to the memory device that data is to be written to or read from a particular memory. The read/write lines are interconnected together, and information is transmitted in parallel to the memory devices. Data is typically transferred from one memory to another memory in the multi-processor system, and it is not possible to transfer data from one memory to multiple memories simultaneously within the system.

A need has thus arisen for a system to efficiently transfer data from a source multi-processor—s memory to one or more destination multi-processor—s memories in order to accomplish a highly distributed switching system. Such a distribution system must transfer data without requiring direct involvement such as through protocols or handshaking of the source and destination node processors.

A further need has arisen for a distribution system capable of dynamic reconfiguration of distribution patterns.

SUMMARY OF THE INVENTION

A data distribution system for a network of multi-processors, wherein each multi-processor includes a memory for storage of data, the data being accessed by an address, is provided. The system includes an address/data bus interconnected in parallel to the memories of the multi-processors. Circuitry is provided for routing data between one or more of the memories of the multi-processors, The address/data bus is interconnected to the circuit. The circuit generates address information to each of the memories for simultaneous transmission along the address/data bus to the memories for data access. The circuit further generates a memory select signal for each of the memories associated with each of the multi-processors for selecting one of the memories for data access at a selected address. The circuit further generates a read/write signal for each of the memories for selecting one or more memories associated with the multi-processors for data transfer from a specific memory selected by the address and memory select signals to thereby write data simultaneously to multiple memories of the multi-processors at a selected address.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
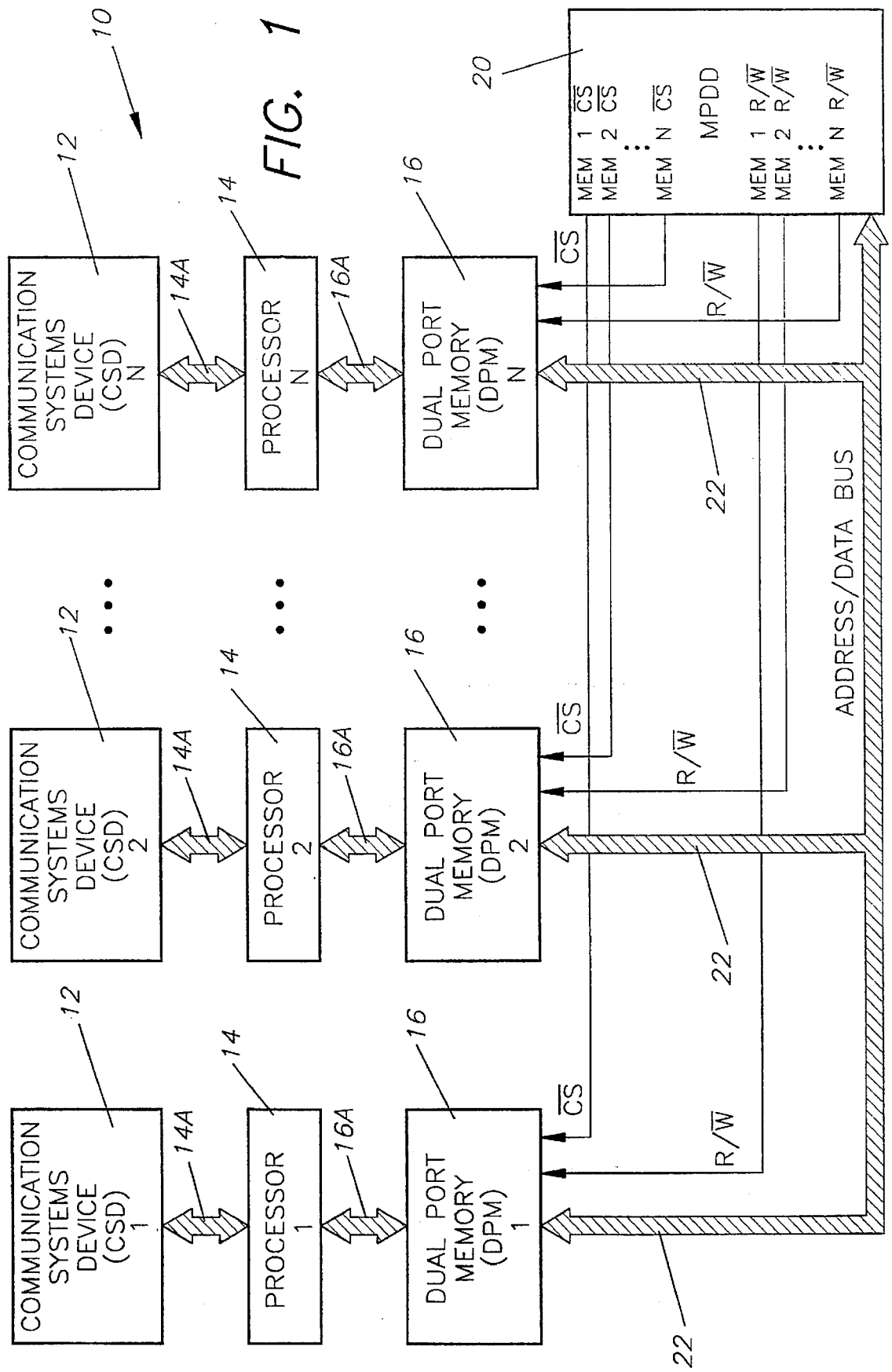
FIG. 1 is a block diagram of a communications system utilizing the present data distribution system.

Referring to FIG. 1, a communications system, generally identified by the numeral 10 is illustrated. Communications system 10 includes multiple communication system devices (CSD) 12 such as for example, digital telephones, radios, reprographic devices, data terminals including, such as for example, teletypes, computers, personal computers, and the like. Each device 12 communicates with one or more devices 12 in the communications system, 10. The present invention functions to switch digitized audio or digital data samples between one or more devices 12. For example, one device 12 may comprise a telephone, and it is desired that multiple devices 12 be interconnected to receive data from the single telephone.

Associated with each device 12 is a processor 14 interconnected via a bus 14a. Associated with each processor is a dual port memory (DPM) 16. Memory 16 interfaces to processor 14 via a bus 16a. The present invention utilizes a multi-processor data device 20 for transferring digitized audio and digital data between two or more of memories 16 simultaneously. Device 20 is interconnected to each memory 16 via an address/data bus 22. Access to each memory 16 is accomplished through a memory chip select (CS) signal which is generated by device 20 and is interconnected to each of memories 16. Also generated by device 20 is a memory read/write signal which is applied to each of memories 16. An important aspect of the present invention is that each read/write line is separate and distinct for each memory 16 as opposed to a traditional architecture in which the memory read/write lines are all tied together from a single controller. Communications system 10 may include multiple processors 14, it being understood that processors 1-N are shown for illustrative purposes only. Device 20 generates memory select signals and read/write signals for each memory associated with the multiple processors 14 of the communications system 10.

Through use of the present invention, data can be broadcast from, for example, memory 16 (1) to one or more of memories 16(2)–16(N). This broadcasting of data occurs simultaneously to the memories to which data is to be written. In this manner, distribution of data takes place simultaneously among the processors 14 of the present invention. A particular memory 16 is accessed through generation of the memory chip select signal. Specific data within a memory 16 is accessed through the generation of a read/write signal in combination with the data address generated by bus 22. The specific memory 16 to which data is to be broadcast is designated through the activation of memory chip select signals as well as the read/write signals associated with each of the memories 16. Data is transmitted to one or more of the selected destination memories 16 via address/data bus 22. Data items are distributed among processors 14 in system 10 by selectively reading data from a single source processor memory 16 and writing the data item to one or more destination processors 16. Write accesses can be made to any address location within an individual memory 16 or a group of memories 16. A write to all processors 14 would therefore be a broadcast of the selected data item to each of the memories 16 in system 10.

Figure 2:
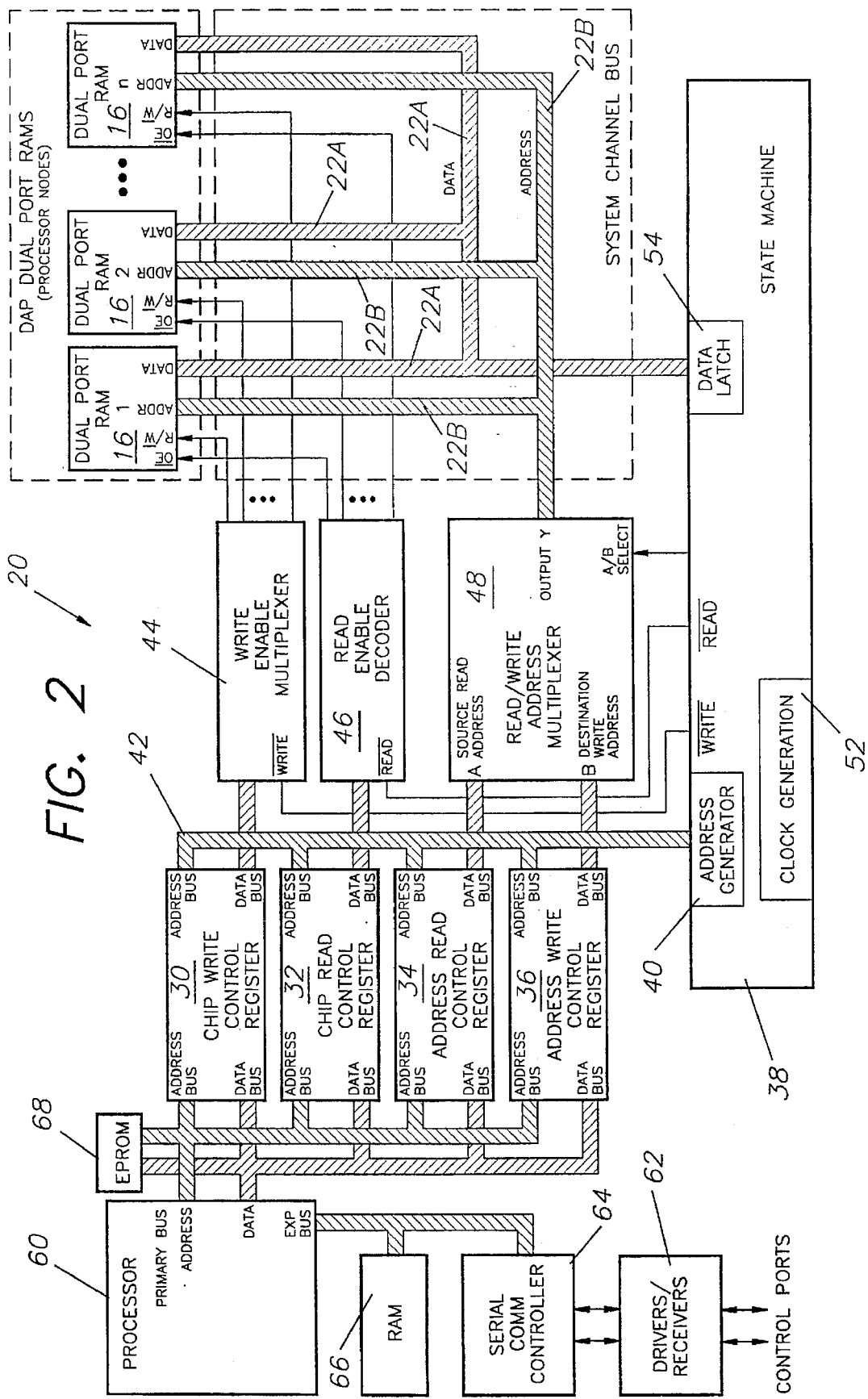
FIG. 2 is a detailed block diagram of the present data distribution system.

Referring simultaneously to FIGS. 1 and 2, as previously stated, each processor 14 includes a dual port memory 16. One port is accessed by processor 14, while the other port is accessed by device 20 via bus 22. FIG. 2 illustrates bus 22a being the data portion of bus 22 and bus 22b being the address portion of bus 22. Device 20 possesses individual control over all dual port memory read, chip select, and write lines. Through the present register addressing scheme including registers, 30, 32, 34, and 36, device 20 has the ability to read from an address within any single memory 16 and then write to an address within any one or more memories 16.

Chip write control register 30 determines which memory 16 is to be written to on each data distribution cycle. Register 30 is a dual-ported RAM device which allows simultaneous read/write of memory elements from two bus paths. Device 20 writes to register 30 and a state machine 38 reads from register 30. Chip read control register 32 determines which of memories 16 are read on each data distribution cycle. Register 32 is a dual-ported RAM device which allows simultaneous read/write of memory elements from two bus paths. Device 20 writes to register 32 and state machine 38 reads from register 32. Address read control register 34 determines the destination address written to within the memory 16 selected. The read address is generated by state machine 38. Address write control register 36 determines the source address read from within the memory 16 which is selected. State machine 38 communicates through an address generator 40 and a bus 42 with each register 30, 32, 34, and 36. Register 30 communicates with memory 16 via a write enable multiplexer 44. Chip read control register 32 communicates with memory 16 via a read enable controller 46. Address read control register 34 and address write control register 36 interfaces to address bus 22b via a read/write address multiplexer 48.

Write enable multiplexer 44 distributes memory 16 write signals originating from state machine 38 to one or more memories 16 read/write inputs. Gate enable inputs originate from register 30 data bus. Read enable decoder 46 distributes memory 16 read signals originating from state machine 38 to one or more memory (OE) inputs. Gate enable inputs originate from register 32 data bus. Write address multiplexer 48 allows the present device 20 to function in an active or monitor mode. State machine 38 provides timing and control sequence to read data items from a memory 16 location and then distribute data items to one or more memories 16. State machine 38 outputs address patterns in a modulo-M count fashion. This address is used to access chip write control register 30, chip read control register 32, address read control register 34, address write control register 36 and memories 16. Within each data distribution cycle, state machine 38 performs a read from a source memory 16 following by a write to destination memories 16. The cycle time is determined by control line inputs originating from device 20 and clock generation 52. State machine 38 further includes a data latch 54 which functions to temporarily store data which is read from a memory 16 prior to transmission to destination memories 16.

A processor 60 performs the loading of registers 30, 32, 34 and 36. Processor 60 receives control information from system 10 via a driver/receiver 62, a controller 64, and memory 66. Also associated with processor 60 is a memory 68 for storage of control software.

In operation, each bit of the output port of register 30 data bus generates an enable function for the gating of state machine 38 generated read signal to the output enable of memory 16. Similarly, each bit of the output port of chip write control register 32 data bus provides an enable function for the gating of state machine 38 generated write signal to the read/write input of a processor memory 16. The output side of address read control register 34 data bus provides the source read address which is multiplexed onto the address bus 22b which will be read within the selected memories 16. The output side of address write control register 36 data bus provides the destination write address which is multiplexed onto the system channel address bus 22b through multiplexer 48. This bit pattern determines the address of the selected memories 16 which will be written to.

The placement of the source read memory 16 and destination write addresses onto the bus 22 in sequence is performed by state machine 38. The output side addresses of all registers 30, 32, 34, and 36 are tied together and controlled by the address generation block 40 within state machine 38. Once per cycle, state machine 38 generates addresses used to read the contents of the output side of control registers 30, 32, 34 and 36. After accessing a source memory 16 address, the contents are temporarily stored in latch 54 within state machine 38. Subsequently, this data is then written to one or more destination memory 16. The generation of read and write signals for the destination memory 16 is also performed by state machine 38. Therefore, the distribution of data from a location within one processor 14 to another location within another memory 16 associated with another processor 14 can be thought of as a "connection" between two processors. The control of connections is performed by device 20.

To further illustrate the operation of device 20, if was desired to transfer data from memory 16(1) to memory 16(2)–(4) from address 0 of memory 16(1) to address 10 of memories 16(2)–(4), state machine 38 first reads the contents of chip read control register 32 to determine that memory 16(1) is to be read from. State machine 38 would then read from address read control register 34 to find that the address to be read is at location 0. This information, memory 16(1) and address 0 would be transmitted via bus 22 to memory 16(1). State machine 38 would then read register 32 to inform memory 16(1) to activate the output enable and gate the data through multiplexer 48. The data has then been selected from the source and is latched in data latch 54. The first portion of the transaction is therefore complete with the selected data from the source contained within data latch 54. The second half of the transaction cycle applies the selected data to the destination memories 16. State machine 38 fetches the contents of write control register 36 to determine the destination memory 16 to be written to. The contents of write control register 36 is applied via multiplexer 48 to appropriate memory 16. State machine 38 will not generate an active low signal on the read/write signal line for the memory selected and the address that state machine 38 is going to write to will be dictated by the contents of address write control register 36. Once the destination memories are known, state machine 38 fetches the address within each memory 16 to write to, such as in the present example address 10. State machine 38 causes the data to be written to address 10 of each of memories 16(2)–(4) in the present example. Address 10 is contained in the address write control register 36 which is read into state machine 38 and output to bus 22b. The source data is then applied from data latch 54 to data bus 22a. Source data is written to memories 16(2)–(4) simultaneously.

The described operation illustrates the use of device 20 as an active data distributor. Device 20 also functions as a monitor in a monitor mode to ensure that proper data transfer has occurred. In the active mode, device 20 source read and destination addresses flow in bus 22 from source to destination. In the monitor mode, bus 22 address flows toward address control registers 34 and 36 where data is stored. In the active mode, device 20 outputs address information from registers 30–36 and in the monitor mode, device 20 receives inputs from registers 30–36. Device 20 assembles the source and destination addresses seen on bus 22 and inspects the address data through the access port side of address read control register 34 and write control register 36. In the monitor mode, device 20 is still able to receive connection commands over bus 22. By comparing the serial commands with the actual results seen on bus 22, device 20 can assess the performance of the data transfer in the system. If a failure occurs, the monitoring function can seize control away from the on-line function and become active.

It therefore can be seen that the present invention provides for a distribution system in which audio and digital data is transferred between memories of a multi-processor system, transfer data from one memory to a plurality of memories simultaneously. The present device has individual control over all memories within the system.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A data distribution system for a network of multi-processors, wherein each of the multi-processors includes, a memory for storage of data, the data being accessed by an address, the system comprising:

(a) an address/data bus interconnected to the memories of the multi-processors; and (b) data distribution means for routing data to one or more of the memories of the multi-processors without the multi-processors requesting data, said address/data bus being interconnected to said data distribution means, said data distribution means including:

(1) means for generating address information along said address/data bus for simultaneous transmission to each of the memories for data access;

(2) means for generating a memory select signal to each of the memories for selecting one of the memories for data access at a selected address; and (3) means for generating a read/write signal to each of the memories for selecting one or more memories to which data is to be transferred from said address/data bus selected by said address generating means and said memory select means to thereby write data simultaneously to one or more memories of the multi-processors at a selected address.

2. A multi-processor apparatus comprising:

(a) a plurality of processors;

(b) each of said processors including a memory having an address means, read/write activation means, and memory activation means;

(c) address bus means connecting said address means of each of said memories;

(d) multi-processor data distribution means for routing data to one or more of said memories of said processors without said processors requesting data including:

(1) address output means connected to said address bus means for simultaneously sending addresses to all of said plurality of processors;

(2) a plurality of memory select signal output means, one of said plurality of memory select signal output means being connected to one of said plurality of processors; and (3) a plurality of read/write signal output means, one of said plurality of read/write signal output means being connected to one of said plurality of processors; and (e) interconnection means for connecting said read/write activation means and said memory activation means of each of said memories to selected ones of said read/write signal output means and said memory select signal output means, such that activation signals can be applied simultaneously to a plurality of said memories.

3. A method of re-distributing data between a memory section of one processor of a commonly addressed group of N processors, each having a memory section, and a selectable subgroup of M processors each having a memory section comprising, the steps of:

(a) selectively addressing a given memory section of a given processor in the group of N processors by supplying individual read activation and memory activation signals to only the given memory section while supplying a common address set of signals to all memory sections of the N processors to retrieve given data; and (b) addressing memory sections of the plurality of M processors by supplying individual write activation and memory activation signals to only the memory sections of the M processors while supplying a common address set of signals to all memory sections of the N processors to simultaneously write the given data previously retrieved from the memory sections of the N processors to all memory sections of the M processors without the M processors requesting data.

* * * * *